US007182102B2

(12) United States Patent
Kärcher

(10) Patent No.: US 7,182,102 B2
(45) Date of Patent: Feb. 27, 2007

(54) MODULE FOR A VALVE BANK

(75) Inventor: Bernd Kärcher, Neckartenzlingen (DE)

(73) Assignee: Festo AG & Co., Esslingen (DE)

( * ) Notice: Subject to any disclaimer, the term of this patent is extended or adjusted under 35 U.S.C. 154(b) by 18 days.

(21) Appl. No.: 10/546,163

(22) PCT Filed: Dec. 27, 2003

(86) PCT No.: PCT/EP03/14925

§ 371 (c)(1),
(2), (4) Date: Aug. 16, 2005

(87) PCT Pub. No.: WO2004/083647

PCT Pub. Date: Sep. 30, 2004

(65) Prior Publication Data

US 2006/0151035 A1 Jul. 13, 2006

(30) Foreign Application Priority Data

Mar. 15, 2003 (DE) ................................ 103 11 475

(51) Int. Cl.
*F16K 11/10* (2006.01)

(52) U.S. Cl. ....................... 137/884; 333/248; 333/255

(58) Field of Classification Search ................ 137/269, 137/271, 560, 884; 333/239, 248, 255
See application file for complete search history.

(56) References Cited

U.S. PATENT DOCUMENTS 4,538,633 A * 9/1985 Stevens ....................... 137/85
4,726,393 A 2/1988 Herner
6,188,954 B1 2/2001 Hettich
6,209,821 B1 * 4/2001 Gary ......................... 244/53 B
6,463,950 B1 10/2002 Staniczek
6,581,619 B1 6/2003 Christiani
6,781,477 B1 * 8/2004 Stancil ....................... 333/125

FOREIGN PATENT DOCUMENTS

| | | |
|---|---|---|
| DE | 2 225 060 | 12/1973 |
| DE | 197 29 959 | 12/2000 |
| DE | 199 42 508 | 3/2001 |
| DE | 199 42 509 | 4/2001 |
| DE | 199 54 855 | 4/2001 |
| DE | 198 01 234 | 12/2001 |
| DE | 101 64 677 C1 | 2/2003 |
| DE | 102 60 543 A1 | 7/2004 |
| EP | 0 692 638 | 6/1996 |
| EP | 1 041 325 | 10/2000 |
| JP | 60104876 | 6/1985 |

* cited by examiner

*Primary Examiner*—John Fox
(74) *Attorney, Agent, or Firm*—Hoffmann & Baron, LLP

(57) ABSTRACT

A module for in-line arrangement on at least one further module in a fluid power valve cluster (10) including modules placed in a row adjacent to one another in an in-line direction, comprising communicating means for communication with the at least one further module of the valve cluster (10). For the there is such that the means are designed as waveguide communication means (19, 21 and 23) for communication via a waveguide (14) of the valve cluster (10).

23 Claims, 3 Drawing Sheets

MODULE FOR A VALVE BANK

FIELD OF THE INVENTION

The invention relates to a module for in-line arrangement on at least one further module in a fluid power valve cluster including modules lined up in a line adjacent to one another in an in-line direction, comprising communicating means for communication with the at least one further module of the valve cluster.

BACKGROUND OF THE INVENTION

Such a module is for example disclosed in the German patent publication 198 01 243 D2. The modules of the valve cluster are placed in line. The modules respectively laterally bear electrical contacts. In the assembled state of the valve cluster such electrical contacts engage each other. Accordingly the modules are electrically connected with each other. By way of the electrical connections data, for example, are transmitted for control of the valves present in the modules. For data and energy transmission several contacts are necessary. The modules are therefore expensive to manufacture. Mechanical damage and/or oxidation impairs the contact properties of conventional spring contacts.

The German patent publication 199 42 508 A1 discloses the supply to a pneumatic device, for example a valve, by way of a pneumatic line of pressure and, additionally, by the intermediary of pressure changes, microwaves or acoustic signals using the gaseous medium in the line, the transmission of control signals to the pneumatic device. The German patent publication 199 42 509 A1 discloses in the case of a pneumatic device of the same type as in the said German patent publication 199 42 508 A1 the supply by acoustic waves, microwaves or pressure changes, of electrical energy. The pneumatic devices are respectively individual pneumatic cylinders, which are connected by way of the pneumatic line with a control device. A separate compressed air line leads to each device. The devices are not suitable for a cluster-like structure.

SUMMARY OF THE INVENTION

Accordingly one object of the present invention is to increase the reliability of the communication means in the case of a module of the type initially mentioned.

This object is achieved in the case of the module of the type initially mentioned since the communication means are designed in the form of a waveguide communication means for communication by way of a waveguide of the valve cluster.

The communication by way of the waveguide or hollow conductor is simple and reliable. Using a waveguide transmission may take place at comparatively high transmission frequencies of, for example 1 GHz so that communication with the valve cluster may be performed with a single waveguide. In principle however several waveguides are possible as well.

Preferably the communication means comprise at least one antenna. Such antenna it is for example a question of a slotted waveguide.

The waveguide advantageously renders possible a transmission in the uplink and downlink direction: it is bidirectional.

Preferably the waveguide is designed in the form of a transmission channel separate from the fluid power and supply channels. The waveguide may employed for its intended purpose as a communication channel, in a for example geometrically optimum manner.

It is an advantage for the communication means to be designed for the transmission of energy. In this respect the fact is made use of that comparatively large energy amounts may be transmitted using a waveguide. For instance, approximately one to two watts of electrical power may be transmitted to each module of the valve cluster. The energy received by the communication means is preferably employed for the operation of a valve drive. The valve drive preferably constitutes a component of the module.

The waveguide may for example have a rectangular, round or elliptical cross section.

In order to ensure having a reflection-free termination, a terminating resistance or an electrically conductive termination element is provided for the waveguide. Such element is best comprised in the module in accordance with the invention. For low electrical power levels for example foils are suitable, for example of carbon or a metal coated material. For higher power levels terminating resistances of a ferrite or a graphite and sand composite are suitable. In principle however the waveguide may also have an open end.

Such electrical terminating resistances prevent reflection in the waveguide. The electrical field strength is accordingly evenly distributed in the waveguide. The waveguide is simple to adjust.

Preferably a waveguide section is contained in the module to constitute the waveguide. The waveguide is constituted by an in-line arrangement of the modules.

The waveguide section is preferably enhanced by being electroplated. It is for example electroplated with silver, copper or gold. The electroplated material is preferably in the interior of the waveguide section.

On the waveguide section there is preferably a plug-in end for the production of plug connection with the adjacent waveguide section. It is convenient such plug-in ends are plated at both ends of the waveguide section. The modules can therefore be plugged together in a line to extend or form the waveguide.

It is convenient for the waveguide section to possess electrically conductive contact means for the production of an electrical connection with the adjacent waveguide section. Such contact means may for example be constituted by plug ends with a suitable electrical conductivity. Furthermore the contact means may comprise a rosette or a flange. Preferably the contact means comprise silver and/or copper plated conductive resilient elements or such elements rendered electrically conductive in some other way. Same ensure optimum contact reliability.

Preferably the waveguide section possesses a sealing ring or a seal groove. Such sealing means prevent the access of pressure medium or the action of other environmental effects likely to impede transmission quality in the interior of the waveguide. The sealing means preferably comprise elastic elements, as for example of a silicone such as a silicone rubber.

Preferably at the end there are central transmitting and/or receiving means at the end on the waveguide. Such means may be present in a module in accordance with the invention.

It shall be noted that more than one waveguide may be provided, whereby for example one waveguide may be provided for each transmission direction.

Preferably again information and/or energy is transmitted with at least two transmission frequencies in the waveguide. For instance, a first and a second transmission frequency for transmission in the downlink direction and, respectively, in the uplink direction. It is clear that furthermore different frequencies may be provided for the energy and data transmission.

It is admittedly preferred for the waveguide to possess the same cross section from end to end. However for forming transitions the waveguide may have a waveguide union for connection to join waveguides together which have different cross sections. The length of the transition or join is preferably large in comparison with the length of the waveguide. There may also be a so-called twist union for rotation of the planes of polarization, for example through 90 degrees. The valve cluster in accordance with the invention (for example a module as well) may also comprise a coaxial transition as a join between a waveguide and a coaxial cable.

In the case of the module various different geometries are possible:

Preferably the module comprises a central control unit for the control of additional modules of the valve cluster. It constitutes for example the bus master of a data or energy bus formed on the waveguide. Such a module can be termed a central control module of the valve cluster.

The module may also be a central diagnostic module. It then preferably comprises a central diagnostic module for monitoring further modules of the valve cluster.

In the case of a further version of the invention the module is a local control module or a valve module. Such a module comprises control and/or diagnostic means for control or, respectively, monitoring at least one valve and/or valve drive. The valve or, respectively, the valve drive may constitute a separate subassembly, which is controlled or, respectively, monitored. Such subassemblies are preferably arranged in line in the row direction. A preferred version of the invention provides for the valve or, respectively, the valve drive is comprised in the module in accordance with the invention. It is then designed as valve module. In connection with a valve cluster it is possible to speak of a valve disk too.

In a further form of the invention the module is designed in the form of a terminating module for terminating the waveguide. The terminating module can be a sort of passive module which for example comprises the above mentioned terminating resistance. It may however also be a sort of active terminating module that comprises the above mentioned central control unit.

More particularly in the case of the latter central control module it preferably on the one hand contains the waveguide communication means for communication with the further modules of the valve cluster and on the other hand possesses second waveguide communication means for communication with a master control.

In the case of the valve cluster in accordance with the invention several different modules of the above mentioned modules may be placed in line, as for example a central control module, several valve modules and a terminating module.

In the following the invention will be described on the basis of one working example with reference to the drawing in more detail:

DETAILED DESCRIPTION OF THE PREFERRED EMBODIMENTS

Figure 1:
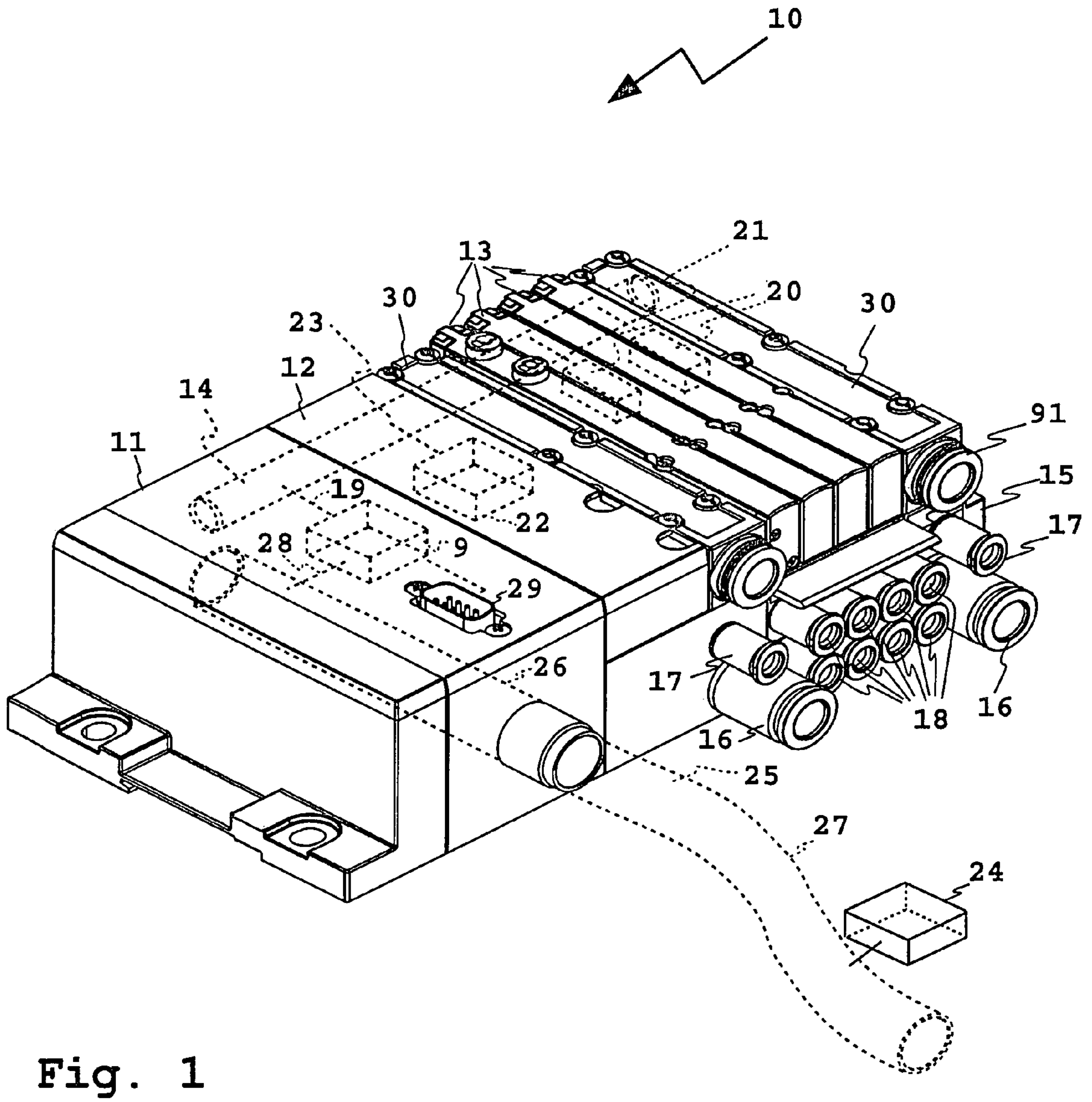
FIG. 1 shows a first working embodiment of a valve cluster in accordance with the invention having two waveguides in a perspective elevation.

In the case of a valve cluster 10 in accordance with FIG. 1 a central control module 11, a diagnostic module 12 and valve modules 13 are joined by a waveguide 14. The central control module 11 controls and monitors the valve modules 13. The diagnostic module 12 provides diagnostic tools, as for example for detecting and visualizing wear, faults or the like in the valve modules 13. The valve modules 13 comprise valve drives, not illustrated, valve drives and pneumatic valves, not illustrated either, which are controlled and monitored by control means 20. The control means 20 comprise a processor for example and also memories. They are for example in the form of application specific integrated circuits (ASICs) or comprise ASICs.

The valve modules 13 are arranged on a distributor block 15 in whose interior a channel system, not illustrated, is located, for example for supplying the valves of the valve module 13 with compressed air. At the front side of the valve block 15 there are supply connections 16, pilot control connections 17 and furthermore load or, respectively, power connections 18. The compressed air supplied at such supply connections 16 compressed air flows in a fashion dependent on the position of the valves of the valve modules 13 out at the power connections 18. These valves of the valve modules 13 are operated by pilot control valves, for whose operation pilot control compressed air is supplied by way of the pilot control connections 17. For driving the valve members of the pilot control valve use is made of electrical drives, as for example electromagnetic and/or electrostatic drives, which are driven by the control means 20.

A central control means 9, as for example a processor and memory, in the central control module transmits, by way of an antenna 19 in the so-called downlink direction, control signals through the waveguide 14. The antenna 19 constitutes a component of waveguide communication means of the control module 11. The control signals are received by the control means 20 by means of antennas 21. In the present case all control means 20, that are connected with the waveguide 14, receive the control signals. Accordingly a bus is formed. For instance using suitable address data in the control signals the respective control means 20 of the valve modules 13 can detect whether the respective control signal is intended for them.

In the reverse direction, that is to say in the so-called uplink direction, the control means 20 transmit data by way of the waveguide 14. The control means 20 use the antennas 21 to transmit message information for example as received from the central control means 9. Furthermore the message information is received by diagnostic means 22 with the aid of an antenna 23. The diagnostic means 22 comprise for example a processor and a memory for the evaluation of the received message signals and also a display device, as for example an LCD display, for visualizing the information. On the display device faults or other operational states of the valve modules 13 are displayed.

In the present case the waveguide 14 is a waveguide with a circular cross section. It is constituted by the modules 11 through 13. In same respective waveguide sections are present. Owing to the lining up of the waveguide sections the waveguide 14 is formed. The length of the waveguide sections is preferably optimized to suit the cross section of the waveguide 14 and the transmission and reception frequencies employed.

The waveguide 14 extends in the present case, in addition to the modules 12 and 13 participating in the communication by way of the waveguide 14, also through muffler modules 30. One muffler module 30 is located between the diagnostic module 12 and the valve module group constituted by the valve modules 13. The other silencer module 30 is located on the opposite side of the valve module group. To the fore on the silencer modules 30 spent air connections 91 are provided.

The central control means 9 communicates with a very diagrammatically shown master control 24 with the aid of a second waveguide 25. The waveguide 25 also has a circular cross section. In the present case it is formed by a rigid waveguide section 26 and a flexible waveguide section 27, as for example an electrically conductive hose. The control means 9 transmits and receives data by means of an antenna 28 on the waveguide 25.

As a further—as it were, conventional—possibility of communication a connection, for example having a serial bus protocol, may be produced with the control means 9. By way of a plug 29 an electrical connection may be produced to the serial interface.

Figure 2:
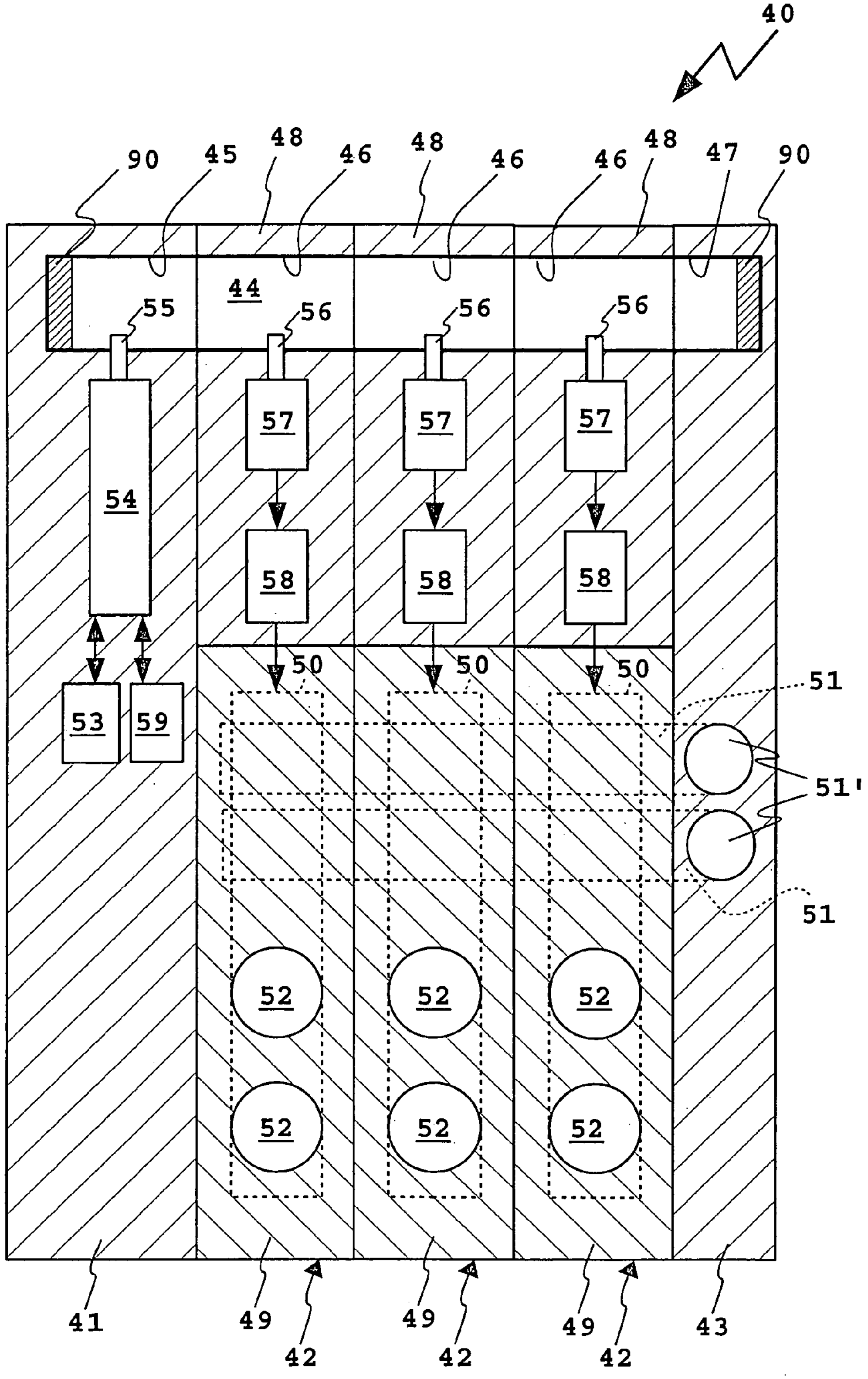
FIG. 2 shows a highly diagrammatic cross sectional view of a valve cluster with a waveguide that is formed between a central control module and furthermore decentral control modules.

In the case of one valve cluster 40 in accordance with FIG. 2 a central control module 41, valve modules 42 and furthermore a terminating module 43 are placed in line. The control module 41 and also the valve modules 42 communicate with each other via a wavegude 44. The waveguide is formed by waveguide sections 45, 46 and 47 of the modules 41 through 43.

The valve modules 42 comprise so-called decentral control modules 48 that contain the waveguide sections 46 to form the waveguide 44 and valve component groups 49 having pneumatic valve 50. The valves 50 are illustrated in a highly diagrammatic manner.

Unlike the valve manifold or cluster 10 in the case of the valve cluster 40 there is no fluid or, respectively, compressed air distributor block or manifold. Instead of it the valve modules 42 are designed in the form of so-called solid board valves having ducts having ducts and duct sections for the distribution and supplying the compressed air. For disposing of pressure medium or venting in the case of the valve component groups 49 supply ducts 51 are provided through which input of compressed air is possible by way of supply connections 51' at the terminating module 43. Dependent on the position of the pneumatic valves 50 such compressed air flows through power ducts 52 opening at the front at power connections generally of the same type as power connections 18 at the front on the valve cluster 40.

At an electrical interface 53 the central control module 41 receives control instructions from a master control, not illustrated. Such control instructions are converted by a control means 54 into control instructions for the valve modules 42. The control means 54 sends the control instructions by means of an antenna 55 on the waveguide 44. The local control modules 48 receive, by means of antennas 56, the control instructions. In accordance with the control instructions control means 57 which for example comprise ASICs, valve drives 58, as for example electromagnets. The valve drives 58 actuate valve members of the pneumatic valves 50.

The successful or unsuccessful performance of the control instructions is communicated by the control means 57 to the central control module 41 by way of the waveguide 44. For this purpose they send via the antenna 56 corresponding message instructions, which are received with the antenna 55 and are interpreted by the control means 54. The messages are visualized or displayed at a display means 59, for example an LCD display.

The waveguide 44 is terminated by terminating resistances 90. The terminating resistances 90 are matched to the wave resistance of the waveguide and comprise an electrically conductive material. The terminating resistances 90 are provided in the case of the central control module 41 and also the terminating module 43. They are located in the present case on the terminal face of the waveguide sections 45 and, respectively, 47.

The waveguide 44 has, for example, a rectangular cross section. The inner side of the waveguide 44 is in the present case electrically conductive, and for instance it is electroplated with a conductive surface layer. The housing of the control modules 48 otherwise comprise plastic for example.

Figure 3:
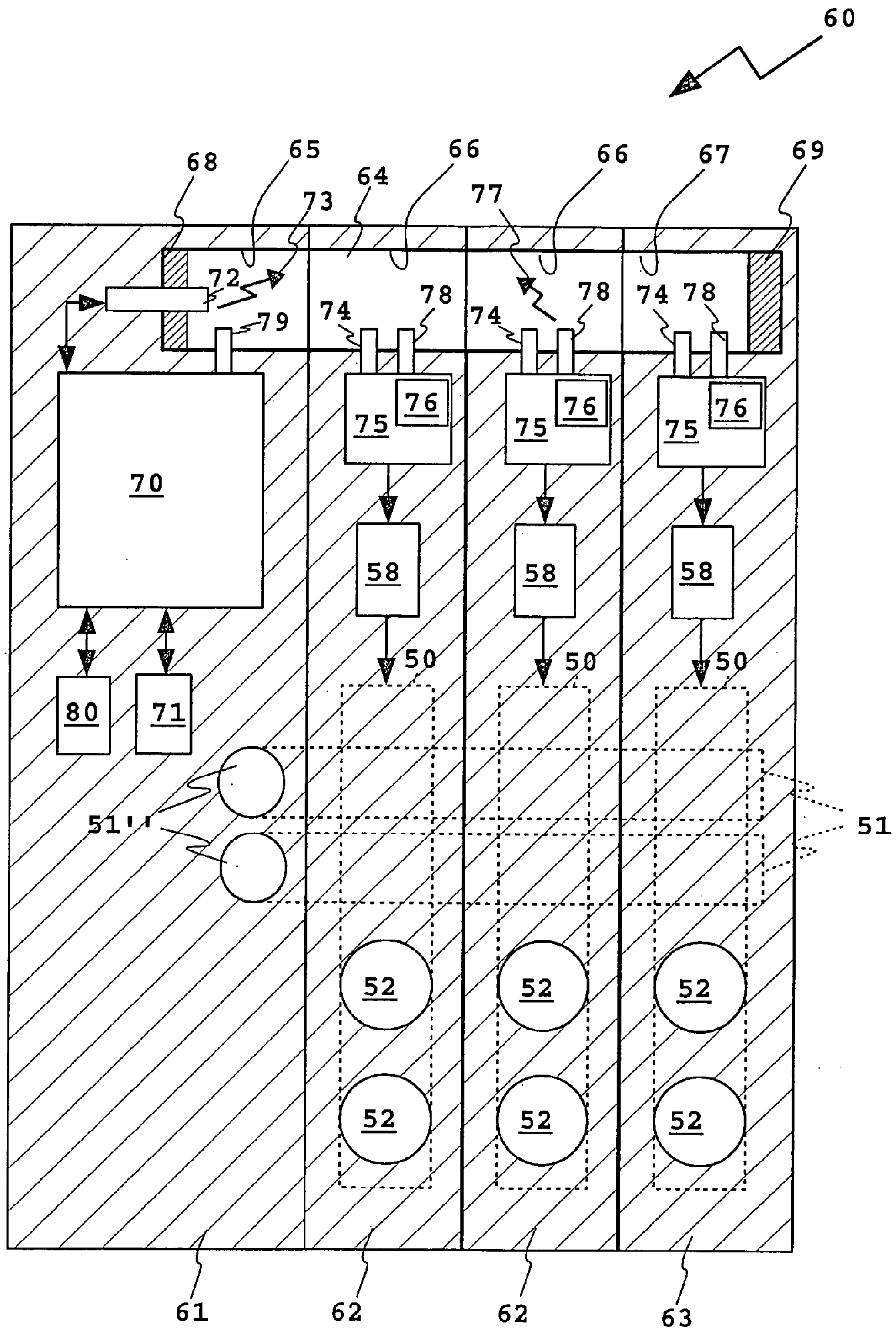
FIG. 3 shows a highly diagrammatic cross sectional view of a valve cluster with a waveguide that is formed between a central control module and valve modules.

In the case of a valve cluster 60 in accordance with FIG. 3 the modular configuration is somewhat less emphasized than in the case of the valve cluster 40. However to the extent that the valve cluster 60 has similar or identically functioning components like in the valve cluster 40, same are provided with the same reference numeral and are not described again in the following.

In the case of the valve cluster 60 a central module 61 and valve modules 62 and 63 are placed in line. The modules 61 through 63 communicate by way of a waveguide 64. Furthermore by way of the waveguide 64 energy is transmitted. The valve modules are essentially the same as the valve modules 42, there being no separation between the control module and the valve component groups. The valve modules 52 and 63 contain the control means 75, valve drives 58 and pneumatic valves 50. Moreover, in the valve modules 62 and 63 there are duct sections like opening to form supply and power ducts 51 and 52. Like the valve modules 42 the valve modules 62 and 63 are also lined up in a pressure-tight manner. Compressed air is fed into the supply channels 51 via supply connections 51", which are provided on the control module 61. The central control module 61 and also the valve module 63 constitute terminating modules of the valve cluster 60.

The waveguide 64 is constituted by the waveguide sections 65, 66 and 67 of the modules 61 through 63. On the outer end sides of the waveguide 64, in the waveguide sections 65 and 67 terminating resistances 68 and 69 are arranged that terminate the waveguide 64 electrically. The waveguide sections 65 through 67 are for example plugged into one another. It is also possible for them to abut together with flat surfaces in engagement. Preferably they are connected together in an electrically conductive fashion.

In the present case communication takes place with different transmission frequencies via the waveguide. Furthermore the control module 61 transmits the electrical supply energy along the waveguide 64 for the valve modules 62 and 63.

The control module 61 receives control instructions at an interface 71 from a master control, not illustrated. These master control instructions are interpreted by the control means 79 as local control instructions that it transmits with the aid of an antenna 72 and by way of to the to the valve modules 62 and 63. The antenna 68 is a terminal transmission means. It extends through the terminating resistance 68.

The control instructions are transmitted by way of the antenna 72 at a first transmission frequency 73.

For receiving the data at the first transmission frequency 73 receiving antennas (extending into the waveguide 64) are provided at the valve modules 62 and 63. In accordance with the received control instructions the control means 75 control valve drives 58 for driving the valve members of the valves 50.

In the present case all valve modules 62 and 63 receive the instructions transmitted via the antenna 72. For transmission of the instructions a bus protocol is for example utilized. The control means analyses address particulars contained in the control messages. It is also possible however for each of the valve modules 62 and 63 to use a different transmission frequency and for the valve modules 62 and 63 to only receive instructions transmitted at the frequency assigned to them and to convert them for control of the drives 50.

Moreover the control module sends, at the transmission frequency 73, the electrical supply energy necessary for the operation of the valve modules 62 and 63. Such energy is obtained from the received electromagnetic waves by energy converters 76.

In the uplink direction the control means 75 send message information at a second transmission frequency 77. For transmission at the second frequency 77 antennas 78 are provided at the valve modules 62 and 63. The control module 61 receives the messages of the valve modules 62 and 63 with the aid of an antenna 79. The antennas 78 and 79 are tuned to the second transmission frequency 77. The messages of the valve modules 62 and 63 are displayed by the central control module 61 using display means 80.

It is also possible for the waveguides 14, 44, and 64 to be termed microwave buses. The electromagnetic waves serving for communication between the connected modules and if necessary for the transmission of energy are preferably so-called microwaves. Their wave length is for example in a range extending from a few millimeters to centimeters.

The invention claimed is:

1. A module for in-line arrangement on at least one further module in a fluid power valve cluster including modules lined up in a line adjacent to one another in an in-line direction, comprising communicating means for communication with the at least one further module of the valve cluster, characterized in that the communication means are adapted for communication via a waveguide of the valve cluster.

2. The module as set forth in claim 1, characterized in that the communication means comprise at least one antenna.

3. The module as set forth in claim 1, characterized in that the waveguide is in the form of a transmission channel separate from fluid power and supply channels.

4. The module as set forth in claim 1, wherein the communication means are designed for energy transmission.

5. The module as set forth in claim 4, characterized in that energy received from the communication means is suitable for the operation of a valve drive.

6. The module as set forth in claim 1, wherein the waveguide possesses a rectangular, round or elliptical cross section.

7. The module as set forth in claim 1, further comprising a terminating resistance or an electrically conductive terminating element.

8. The module as set forth in claim 1, further comprising a waveguide section for the formation of the waveguide.

9. The module as set forth in claim 8, characterized in that the waveguide section is enhanced by being electroplated.

10. The module as set forth in claim 8, characterized in that the waveguide section has a plug-in end for producing a plug connection with an adjacent waveguide section.

11. The module as set forth in claim 8, wherein the waveguide section comprises electrically conductive contact means in the form of a rosette or a flange for producing an electrical connection with an adjacent waveguide section.

12. The module as set forth in claim 11, characterized in that the contact means comprise resilient elements electroplated with silver and/or copper.

13. The module as set forth in claim 8, wherein the waveguide section possesses a sealing ring and/or a seal groove.

14. The module as set forth in claim 1, further comprising a terminal waveguide transmission and/or receiving means.

15. The module as set forth in claim 1, wherein information and/or energy is transmitted in the waveguide at two transmission frequencies at least.

16. The module as set forth in claim 1, further comprising a waveguide transition member for the connection of waveguides with different cross sections and/or a twist union for rotation of the planes of polarization.

17. The module as set forth in claim 1, further comprising a central control unit for the control of further modules of the valve cluster.

18. The module as set forth in claim 1, further comprising a central diagnostic unit for monitoring further modules of the valve cluster.

19. The module as set forth in claim 1, further comprising control and/or diagnostic means for the control or, respectively, monitoring of at least one valve and/or valve drive.

20. The module as set forth in claim 19, characterized in that the module is designed in the form of a valve module, which comprises the at least one valve or, respectively, the valve drive.

21. The module as set forth in claim 1, wherein the module is designed in the form of a terminating module to terminate the waveguide.

22. The module as set forth in claim 1, wherein the waveguide communication means are designed for communication with the further modules of the valve cluster and that it comprises second waveguide communication means for communication with a master control.

23. A valve cluster comprising at least one module as set forth in claim 1.

* * * * *